United States Patent
Lee et al.

(10) Patent No.: US 7,965,354 B2
(45) Date of Patent: Jun. 21, 2011

(54) COLOR FILTER SUBSTRATE FOR LIQUID CRYSTAL DISPLAY AND METHOD OF FABRICATING THE SAME

(75) Inventors: Cheol Hwan Lee, Gyeonggi-Do (KR); Yoon Seok Choi, Gyeonggi-Do (KR); Dae Suk Kim, Gyeonggi-Do (KR); Suk Choi, Gyeonggi-Do (KR)

(73) Assignee: Hydis Technologies Co., Ltd., Gyeonggi-Do (KR)

( * ) Notice: Subject to any disclaimer, the term of this patent is extended or adjusted under 35 U.S.C. 154(b) by 308 days.

(21) Appl. No.: 12/099,561

(22) Filed: Apr. 8, 2008

(65) Prior Publication Data

US 2008/0252831 A1    Oct. 16, 2008

(30) Foreign Application Priority Data

Apr. 11, 2007  (KR) .................. 10-2007-0035546

(51) Int. Cl.
  *G02F 1/1333*  (2006.01)
  *G02F 1/1335*  (2006.01)
  *G02F 1/1337*  (2006.01)
(52) U.S. Cl. ......... 349/106; 349/110; 349/129; 349/130
(58) Field of Classification Search .............. 349/106, 349/110, 129, 130
  See application file for complete search history.

(56) References Cited

U.S. PATENT DOCUMENTS

| | | | | |
|---|---|---|---|---|
| 4,194,812 A | * | 3/1980 | Hara et al. ................. 359/274 |
| 5,667,631 A | * | 9/1997 | Holland et al. ................. 216/13 |
| 6,414,729 B1 | * | 7/2002 | Akiyama et al. ................. 349/38 |
| 6,630,975 B1 | * | 10/2003 | Terashita ................. 349/139 |
| 6,924,876 B2 | * | 8/2005 | Kubo et al. ................. 349/193 |
| 2005/0195353 A1 | * | 9/2005 | Park et al. ................. 349/139 |
| 2007/0029280 A1 | * | 2/2007 | Lee et al. ................. 216/41 |

FOREIGN PATENT DOCUMENTS

KR   1020070000888 A   1/2007

OTHER PUBLICATIONS

Birendra Bahadur, Liquid Crystals Applications and Uses 1990, World Scientific, vol. 1, pp. 171-194.*

* cited by examiner

*Primary Examiner* — David Nelms
*Assistant Examiner* — David Y Chung
(74) *Attorney, Agent, or Firm* — The Webb Law Firm

(57) ABSTRACT

A color filter substrate for a liquid crystal display and a method of fabricating the same are provided. The color filter substrate for a liquid crystal display includes: light shielding parts formed on a front surface of a substrate at predetermined intervals to prevent light leakage; color filter Layers disposed between the light shielding parts on the front surface of the substrate and including color filter patterns of red (R), green (G) and blue (B) for implementing a color image; and a transparent conductive layer formed on a rear surface of the substrate, where the rear surface of the substrate is opposite the front surface of the substrate on which the color filter layers are formed, and formed in a porous structure having a plurality of holes spaced at predetermined intervals. Therefore, it is possible to shield an electrostatic field due to external static electricity and improve image display quality, thereby increasing high brightness characteristics and readability.

11 Claims, 2 Drawing Sheets

COLOR FILTER SUBSTRATE FOR LIQUID CRYSTAL DISPLAY AND METHOD OF FABRICATING THE SAME

BACKGROUND OF THE INVENTION

1. Field of the Invention

The present invention relates, in general, to a color filter substrate for a liquid crystal display (LCD) and a method of fabricating the same, and more particularly, to a color filter substrate for an LCD and a method of fabricating the same, that are capable of shielding an electrostatic field due to external static electricity and improving image display quality to increase high brightness characteristics and readability by forming a transparent conductive layer of a porous structure having a plurality of holes on a rear surface of an insulating substrate applied to the color filter substrate for an LCD.

2. Description of the Related Art

In recent times, one of LCDs which are widely used is a twisted nematic (TN) LCD. The TN LCD employs a method of forming electrodes on two substrates, respectively, arranging a liquid crystal director to be twisted 90°, and applying a voltage to the electrodes to drive the liquid crystal director.

However, the TN LCD has a disadvantage of providing a narrow viewing angle.

Therefore, in recent times, in order to solve the narrow viewing angle problem, research on LCDs employing various new modes has been widely performed, among which are, for example, an in-plane switching (IPS) mode, an optically compensated birefringence (OCB) mode, and so on.

Among the modes, an LCD employing the IPS mode involves forming two electrodes on a substrate to horizontally rotate liquid crystal molecules with respect to the substrate such that a voltage is applied between the two electrodes to generate an electric field in a direction parallel to the substrate. That is, a longitudinal axis of the liquid crystal molecules is not raised with respect to the substrate.

For this reason, a small variation in birefringence of liquid crystal with respect to a viewing direction causes better viewing angle characteristics in comparison with the conventional TN LCOD.

Hereinafter, a conventional LCD employing an IPS mode will be described in detail with reference to the accompanying drawings.

FIG. 1 is a schematic cross-sectional view of a conventional LCD employing an IPS mode.

Referring to FIG. 1, a liquid crystal panel constituting the conventional LCD employing an IPS mode generally includes a color filter substrate 10 and a thin film transistor substrate (not shown), which are opposite to each other, and a liquid crystal layer (not shown) disposed between the two substrates.

Here, the color filter substrate 10 includes black matrices 12 disposed on an upper substrate 11 at predetermined intervals, color filters 13 disposed between the black matrices 12, and an overcoat layer 14 formed on the entire surface including the color filters 13.

Meanwhile, while not shown, the thin film transistor substrate generally includes data lines disposed opposite to the black matrices 12, counter electrodes formed at one sides of the data lines, and pixel electrodes formed at the other sides of the data lines, on a lower substrate.

In addition, the liquid crystal layer is interposed between the color filter substrate 10 and the thin film transistor substrate, and a transparent conductive layer 15 is formed on an outer surface of the upper substrate 11, i.e., a rear surface thereof, in order to shield static electricity applied from the exterior.

That is, when the substrate is in contact with a charged external object, the upper substrate 11 is also charged to exert direct influence on alignment of the liquid crystal molecules.

Influence due to the charged upper substrate 11 renders light transmittance unable to be controlled by a data voltage, thereby deteriorating image quality.

Therefore, in order to prevent deterioration of image quality due to the static electricity, the transparent conductive layer 15 may be formed on the rear surface of the upper substrate 11 to prevent static electricity from being applied from the exterior.

As described above, the conventional transparent conductive layer 15, formed on the rear surface of the upper substrate to remove static electricity, is in contact with a metal bezel of the LCD to function as a ground electrode and to prevent the color filter substrate 10 as a dielectric body from being charged upon introduction of static electricity from the exterior, thereby preventing an electric field introduced into the liquid crystal panel due to the static electricity.

In addition, when the electric field is introduced into the liquid crystal panel, liquid crystals in the liquid crystal panel of a normally black mode are driven by affection of the electric field so that a black screen cannot be driven.

However, the transparent conductive layer 15 formed on the rear surface of the upper substrate 11 to remove static electricity acts as a factor lowering transmissivity of the liquid crystal panel by 8% to 10%, thereby potentially disappointing a customer demanding high brightness.

In addition, the upper substrate 11 and the transparent conductive layer 15 have different refractive indexes to directly reflect external light such as sunlight or fluorescent light at an interface between the upper substrate 11 and the transparent conductive layer 15, not diffusing the external lighter thereby lowering a contrast ratio to deteriorate image display quality.

SUMMARY OF THE INVENTION

Accordingly, the present invention has been made keeping in mind the above problems occurring in the related art, and an object of the present invention is to provide a color filter substrate for an LCD and a method of fabricating the same, that are capable of shielding an electrostatic field due to external static electricity and improving image display quality to increase high brightness characteristics and readability by forming a transparent conductive layer of a porous structure having a plurality of holes on a rear surface of an insulating substrate applied to the color filter substrate for an LCD.

In order to achieve the above object, according to one aspect of the present invention, there is provided a color filter substrate for a liquid crystal display including: light shielding parts formed on a front surface of a substrate at predetermined intervals to prevent light leakage; color filter layers disposed between the light shielding parts on the front surface of the substrate and including color filter patterns of red (R), green (G) and blue (B) for implementing a color image; and a transparent conductive layer formed on a rear surface of the substrate, where the rear surface of the substrate is opposite the front surface of the substrate on which the color filter layers are formed, and formed in a porous structure having a plurality of holes spaced at predetermined intervals.

Here, each of the holes may be formed inclined, whose width is shortened from the top to the bottom when incidence of light is occurred from the top to the bottom. Each of the holes is formed inclined at an angle ranging from 20 to 50°.

The hole may have a diameter of 2 to 3 μm.

When the transparent conductive layer is formed of indium-tin-oxide (ITO) or indium-zinc-oxide (IZO), the transparent conductive layer may have a thickness of 0.04 to 0.16 μm, and when formed of conductive transparent resin, the transparent conductive layer may have a thickness of 0.3 to 1 μm.

According to another aspect of the present invention, there is provided a liquid crystal display panel including: a color filter substrate including color filter layers formed on a front surface of a substrate at predetermined intervals and including color filter patterns of red (R), green (G) and blue (B) for implementing a color image, and a transparent conductive layer formed on a rear surface of the substrate, where the rear surface of the substrate is opposite the front surface of the substrate on which the color filter layers are formed, and formed in a porous structure having a plurality of holes spaced at predetermined intervals; a thin film transistor substrate spaced apart from and opposite to the color filter substrate and including a plurality of thin film transistors; and a liquid crystal layer disposed between the color filter substrate and the thin film transistor substrate.

According to still another aspect of the present invention, there is provided a method of fabricating a color filter substrate for a liquid crystal display including: (a) forming light shielding parts on a front surface of a substrate at predetermined intervals; (b) forming color filter layers disposed between the light shielding parts on the front surface of the substrate and including color filter patterns of red (R), green (G) and blue (B); (c) forming a transparent conductive layer on a rear surface of the substrate, where the rear surface of the substrate is opposite the front surface of the substrate on which the color filter layers are formed; and (d) patterning the transparent conductive layer to form a plurality of holes spaced at predetermined intervals.

At this time, in step (d), when the holes are formed, an etching level of the transparent conductive layer may be adjusted to form each of the holes inclined, whose width is shortened from the top to the bottom when incidence of light is occurred from the top to the bottom. Each of the holes is formed inclined at an angle ranging from 20 to 50°.

BRIEF DESCRIPTION OF THE DRAWINGS

The above and other objects, features and other advantages of the present invention will be more clearly understood from the following detailed description when taken in conjunction with the accompanying drawings, in which.

DETAILED DESCRIPTION OF THE INVENTION

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art.

Figure 2:
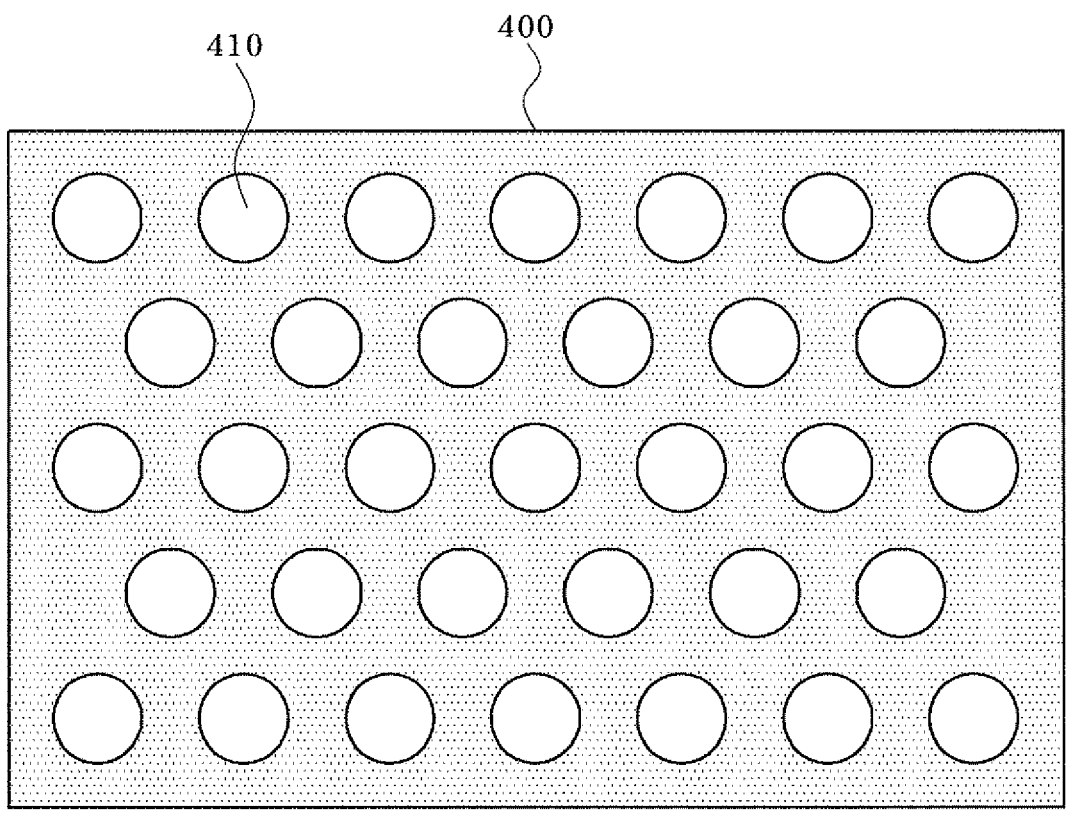
FIGS. 2 and 3 are a plan view and a cross-sectional view of a color filter substrate for an LCD in accordance with an exemplary embodiment of the present invention, respectively.
Figure 3:
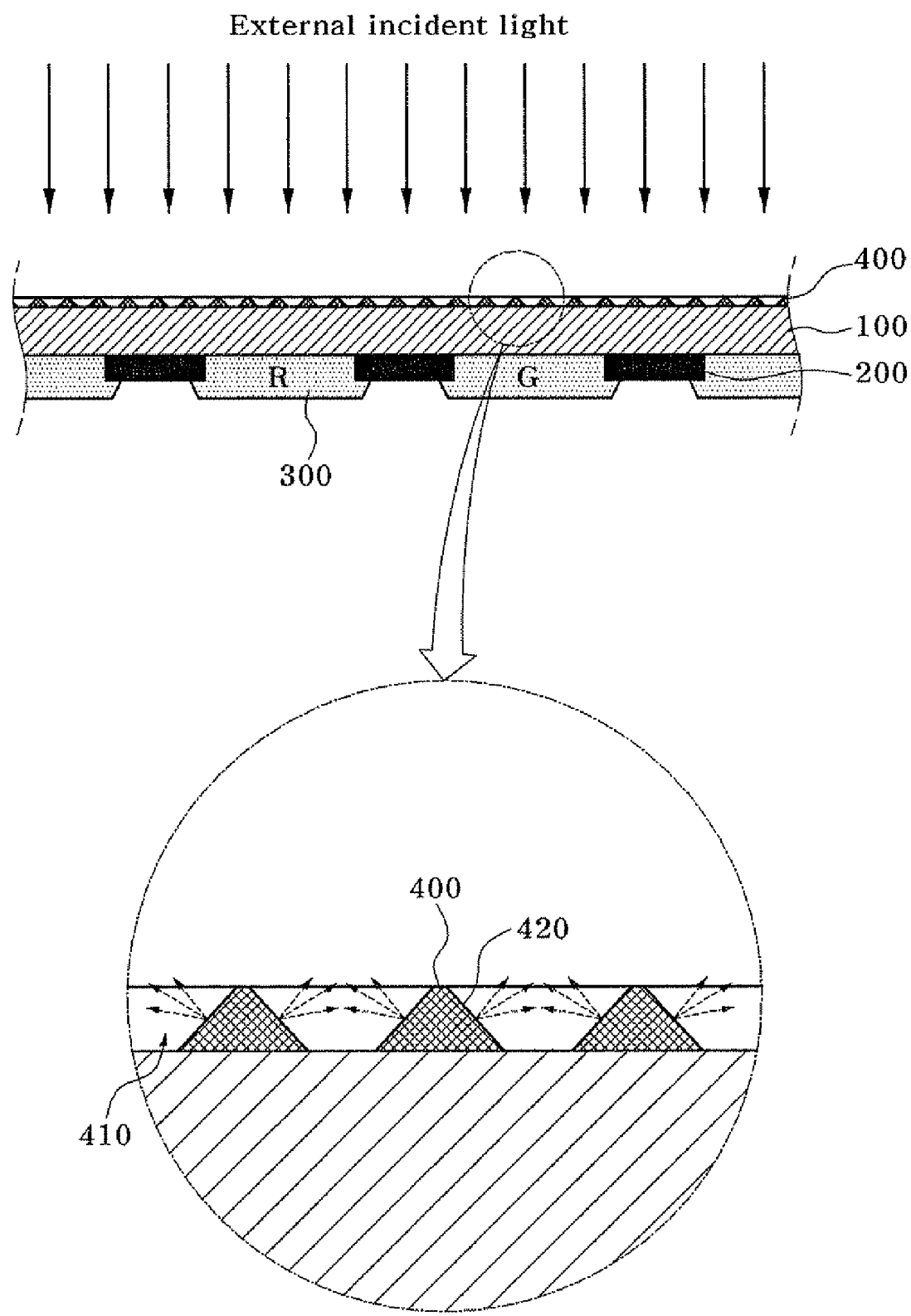

FIGS. 2 and 3 are a plan view and a cross-sectional view of a color filter substrate for an LCD in accordance with an exemplary embodiment of the present invention, respectively.

Referring to FIGS. 2 and 3, the color filter substrate for an LCD in accordance with an exemplary embodiment of the present invention generally includes an insulating substrate 100, black matrices 200, color filter layers 300, and a transparent conductive layer 400.

Here, the black matrices 200 are light shielding parts for preventing light leakage, which are disposed on the substrate 100 at predetermined intervals. The black matrices, formed of a black pigment-added photosensitive organic material, divide the color filters of red (R), green (G) and blue (B). The black pigment may include carbon black, titanium oxide, or the like.

The color filter patterns of the color filter layers 300 are alternately arranged between the black matrices 200 in a sequence of red (R), green (G) and blue (B). The color filter layers 300 function to provide color to light irradiated from a back light unit (not shown) and passed through the liquid crystal layer (not shown). The color filter layers 300 are generally formed of a photosensitive organic material.

In addition, an overcoat layer (not shown) may be formed on the color filter layers 300 to remove a step difference generated due to the color filter layers 300 to thereby improve planarity.

Further, the transparent conductive layer 400, a distinctive element of the present invention, is in contact with a metal bezel of a liquid crystal display to function as a ground electrode, thereby making it possible to prevent the color filter substrate as a dielectric material from being charged upon introduction of external static electricity and prevent an electric field introduced into the liquid crystal panel due to static electricity.

Figure 1:
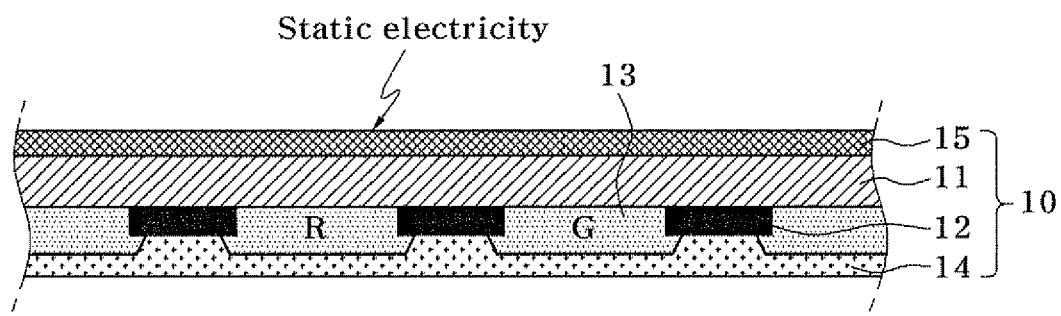
FIG. 1 is a schematic cross-sectional view of a conventional LCD employing an IPS mode.

The transparent conductive layer 400 is formed in a porous structure having a plurality of holes 410 formed at predetermined intervals to increase a pixel open area by approximately 50% or more, thereby increasing transmissivity by causing a decrease in transmissivity of approximately 5% or less, in comparison with the decrease in transmissivity of approximately 8 to 10% of the conventional transparent conductive layer 15 (see FIG. 1).

In addition, the transparent conductive layer 400 may be formed of a transparent conductive metal material having relatively good light transmissivity such as indium tin oxide (ITO) or indium zinc oxide (IZO), or may be formed of a transparent conductive resin material, for example, ITO powder+acryl, epoxy, and so on.

Further, the transparent conductive layer 400 has a thickness of approximately 0.04 to 0.16 μm in the case of an ITO layer or an IZO layer, and a thickness of approximately 0.3 to 1 μm in the case of a transparent conductive resin material.

Furthermore, although the plurality of holes 410 formed in the transparent conductive layer 400 may be formed in a circular shape, not being limited thereto, they may also be formed in other shapes, including oval, rhombic, rectangular, and polygonal shapes.

In addition, although the plurality of holes 410 formed in the transparent conductive layer 400 may be formed at predetermined intervals, not being limited thereto, they may also be formed at irregular intervals.

Further, it is very important to obtain a large reflection interface in order to minimize surface reflection. For this purpose, it is effective to form a plurality of small holes 410 in the transparent conductive layer 400 to increase the number of holes in a unit area. Therefore, the diameter of the plurality of holes 410 formed in the transparent conductive layer 400 may be formed within a range of 2 to 3 μm using a fine patterning technique by diffraction light.

Furthermore, in order to smoothly conduct static electricity for the purpose of deposition of the transparent conductive layer 400, a gap between the holes 410 may be within a range of approximately 4 to 6 μm. That is, in order to smoothly distribute the static electricity without burning, a path of approximately 4 μm or more is required, and when the gap between the holes 410 becomes more than 4 μm, a margin for forming the holes 410 per unit area may be reduced.

In addition, the area of the holes 410 may occupy approximately 4 to 20% of the total area of the transparent conductive layer 400.

Additionally, in order to effectively reflect external incident light, each of the holes 410 is formed inclined, whose width is shortened from the top to the bottom when incidence of light is occurred from the top to the bottom. Each of the holes 410 is formed inclined at an angle ranging from 20 to 50°. As a result, it is possible to reduce a decrease in contrast ratio due to reflection of the external incident light upon introduction of the external light, thereby improving image display quality and obtaining an anti-glare effect.

That is, it is possible to diffuse the reflection light generated from the surface of the transparent conductive layer 400 and the interface between the transparent conductive layer 400 and the color filter substrate beyond a main viewing angler, thereby remarkably improving a surface reflection ratio.

The slope 420 may be readily formed by adjusting an etching level of the transparent conductive layer 400 upon formation of each hole 410. The transparent conductive layer 400 between the holes 410 including the slope 420 may have a cross-section such as a trapezoidal or triangular shape.

Meanwhile, while not shown, since basic components constituting a liquid crystal display, for example, the thin film transistor substrate, the liquid crystal layer, or the like, are the same as in the conventional liquid crystal display, a detailed description thereof will not be repeated.

While the color filter substrate for a liquid crystal display in accordance with an exemplary embodiment of the present invention may be applied to the conventional in-plan switching (IPS) or fringe field switching (FFS) mode liquid crystal display, not being limited thereto, it may also be applied to all liquid crystal displays using optical anisotropy and polarization characteristics of liquid crystal.

Hereinafter, a method of fabricating a color filter substrate for a liquid crystal display in accordance with an exemplary embodiment of the present invention will be described in detail.

First, black matrices 200 are formed on an insulating substrate 100 as a light shielding region. A process of forming the black matrices 200 is as follows. A black matrix photosensitive solution is applied onto the substrate 100, exposed, developed and baked to complete the black matrices 200.

Then, color filter layers 300 formed of color filter patterns of red (R), green (G) and blue (B) to implement a color image are formed on the substrate 100 between the black matrices 200. In this case, the color filter pattern of three primary colors may be formed by applying a material for absorbing white light and transmitting only light having a specific wavelength (red, green, or blue) on the entire surface of the substrate 100, and then patterning the material.

In addition, an overcoat layer may be formed on the color filter layers 300 to remove a step difference generated by the color filter layers 300, thereby improving planarity.

Next, a static electricity removal transparent conductive layer 400 is formed on a rear surface of the substrate 100, where the rear surface of the substrate 100 is opposite the front surface of the substrate 100 on which the color filter layers 300 are formed, to have a certain thickness (preferably, approximately 0.04 to 0.16 .mu.m), and then, the transparent conductive layer is patterned using a conventional photolithography process to form a plurality of holes 410 disposed at predetermined intervals, thereby completing the color filter substrate for a liquid crystal display in accordance with an exemplary embodiment of the present invention.

Additionally, upon formation of each hole 410, an etching level of the transparent conductive layer 400 is adjusted to form a slope 420 inclined to a certain angle (preferably, approximately 20 to 50°) on a portion or a whole of the transparent conductive layer 400 formed between the holes 410 in order to effectively reflect external incident light. As a result, it is possible to reduce a decrease in contrast ratio due to reflection of the external incident light, thereby improving image display quality and obtaining an anti-glare effect.

At this time, the formation of the slope 420 is generally performed using an etching process, for example, in the case of ITO, a wet etching is performed. When a general process is performed, the slope 420 of the ITO has an angle of approximately 50°.

However, when variation of the angle of the slope 420 is needed for specific purposes such as an increase in reflection with respect to a certain angle, an etch rate may be varied through a variation in composition of an etchant, for example, HCl, CH3COOH, and so on, or an adjustment in etch time.

That is, when the etch rate is lowered, since a reaction level due to the etchant is increased at an upper part of the ITO interface, it is possible to lower the angle of the slope 420.

Meanwhile, a color filter process may be performed after forming the transparent conductive layer 400 on the substrate 100 in advance, or the transparent conductive layer 400 may be formed outside the substrate 100 after completion of the color filter process.

As can be seen from the foregoing, in accordance with a color filter substrate for an LCD of the present invention and a method of fabricating the same, it is possible to shield an electrostatic field due to external static electricity and improve image display quality by forming a transparent conductive layer of a porous structure having a plurality of holes on a rear surface of an insulating substrate applied to the color filter substrate for an LCD, thereby increasing high brightness characteristics and readability.

Further, according to the present invention, a portion or a whole of the transparent conductive layer formed between the holes is tapered to a certain angle to make it possible to increase diffusion effect upon introduction of external light, thereby improving image display quality.

Although exemplary embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A color filter substrate for a liquid crystal display comprising:
    light shielding parts formed on a front surface of a substrate at predetermined intervals to prevent light leakage;
    color filter layers disposed between the light shielding parts on the front surface of the substrate and including color filter patterns of red (R), green (G) and blue (B) for implementing a color image; and
    a transparent conductive layer formed on a rear surface of the substrate, where the rear surface of the substrate is opposite the front surface of the substrate on which the color filter layers are formed, and the transparent conductive layer is formed in a porous structure having a plurality of holes spaced at predetermined intervals, wherein said plurality of holes correspond to said light shielding parts and said color filter layers.

2. The color filter substrate as set forth in claim 1, wherein each of the holes is formed inclined, whose width is shortened from the top to the bottom when incidence of light is occurred from the top to the bottom.

3. The color filter substrate as set forth in claim 2, wherein each of the holes is formed inclined at an angle ranging from 20 to 50°.

4. The color filter substrate as set forth in claim 1, wherein the hole has a diameter of 2 to 3 µm.

5. The color filter substrate as set forth in claim 1, wherein the predetermined interval between the holes ranges from 4 to 6 µm.

6. The color filter substrate as set forth in claim 1, wherein, when the transparent conductive layer is indium-tin-oxide (ITO) or indium-zinc-oxide (IZO), the transparent conductive layer has a thickness of 0.04 to 0.16 µm.

7. The color filter substrate as set forth in claim 1, wherein, when the transparent conductive layer is formed of conductive transparent resin, the transparent conductive layer has a thickness of 0.3 to 1 µm.

8. A liquid crystal display panel comprising:
light shielding parts formed on a front surface of a substrate at predetermined intervals to prevent light leakage;
a color filter substrate including color filter layers formed between the light shielding parts on the front surface of the substrate at predetermined intervals and including color filter patterns of red (R), green (G) and blue (B) for implementing a color image, and a transparent conductive layer formed on a rear surface of the substrate, where the rear surface of the substrate is opposite the front surface of the substrate on which the color filter layers are formed, and the transparent conductive layer is formed in a porous structure having a plurality of holes spaced at predetermined intervals;
a thin film transistor substrate spaced apart from and opposite to the color filter substrate and including a plurality of thin film transistors; and
a liquid crystal layer disposed between the color filter substrate and the thin film transistor substrate,
wherein said plurality of holes correspond to said light shielding parts and said color filter layers.

9. A method of fabricating a color filter substrate for a liquid crystal display, comprising:
(a) forming light shielding parts on a front surface of a substrate at predetermined intervals;
(b) forming color filter layers disposed between the light shielding parts on the front surface of the substrate and including color filter patterns of red (R), green (G) and blue (B);
(c) forming a transparent conductive layer on a rear surface of the substrate, where the rear surface of the substrate is opposite the front surface of the substrate on which the color filter layers are formed; and
(d) patterning the transparent conductive layer to form a plurality of holes spaced at predetermined intervals,
wherein said plurality of holes correspond to said light shielding parts and said color filter layers.

10. The method as set forth in claim 9, wherein, in step (d), when the holes are formed, an etching level of the transparent conductive layer is adjusted to form each of the holes inclined, whose width is shortened from the top to the bottom when incidence of light is occurred from the top to the bottom.

11. The method as set forth in claim 10, wherein each of the holes is formed inclined at an angle ranging from 20 to 50°.

* * * * *